United States Patent [19]
Cerruti

[11] Patent Number: 5,778,548
[45] Date of Patent: Jul. 14, 1998

US005778548A

[54] VIEWING DEVICE AND METHOD FOR THREE-DIMENSIONAL NONCONTACTING MEASUREMENTS

[75] Inventor: Piero Cerruti, Turin, Italy

[73] Assignee: DEA-Brown & Sharpe S.p.A., Italy

[21] Appl. No.: 645,647

[22] Filed: May 16, 1996

[30] Foreign Application Priority Data

May 16, 1995 [IT] Italy ............................ TO95 A 000388

[51] Int. Cl.⁶ ............................ G01B 11/03; G01B 21/04
[52] U.S. Cl. ................................................. 33/503; 33/504
[58] Field of Search ........................... 33/503, 504, 1 M

[56] References Cited

U.S. PATENT DOCUMENTS

| | | | |
|---|---|---|---|
| 5,065,526 | 11/1991 | Breyer | 33/503 |
| 5,251,156 | 10/1993 | Heirer et al. | 33/503 |
| 5,301,003 | 4/1994 | Ikeda | 33/503 |
| 5,615,489 | 4/1997 | Breyer et al. | 33/503 |

FOREIGN PATENT DOCUMENTS 9008939  8/1990  WIPO.

OTHER PUBLICATIONS

Translation of WO 90/08939 Aug. 1990 date.
U.K. Search Report Dated Jul. 26, 1996.

*Primary Examiner*—Christopher W. Fulton
*Attorney, Agent, or Firm*—Myers, Liniak & Berenato

[57] ABSTRACT

A viewing device wherein a measuring machine presents a movable element movable along three coordinate axes of the measuring machine; the movable element is fitted with an articulated measuring head supporting a viewing sensor presenting a television camera and a laser beam source; by analyzing the two-dimensional image picked up by the television camera and the position of the laser beam in the two-dimensional image, the coordinates of a point in relation to a reference system of the viewing sensor are determined; and the measurement is subsequently related to the reference system of the measuring machine.

16 Claims, 9 Drawing Sheets

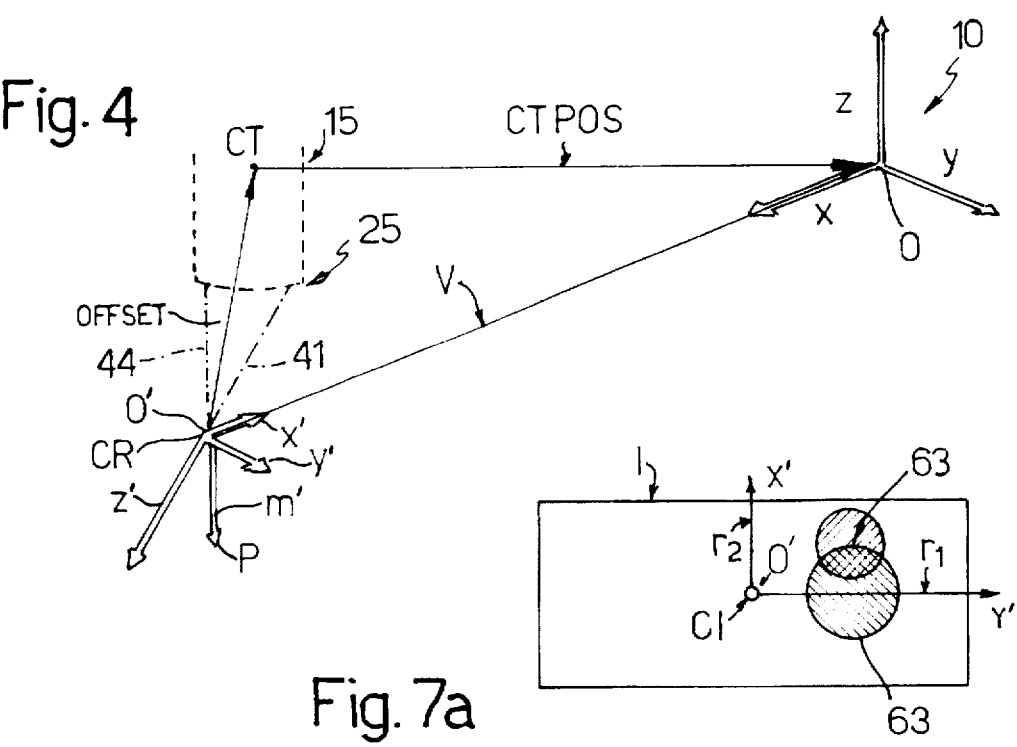
Fig. 4
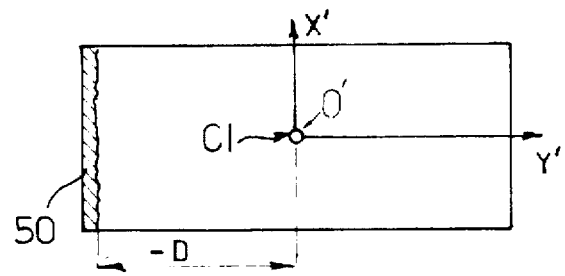
Fig. 7a
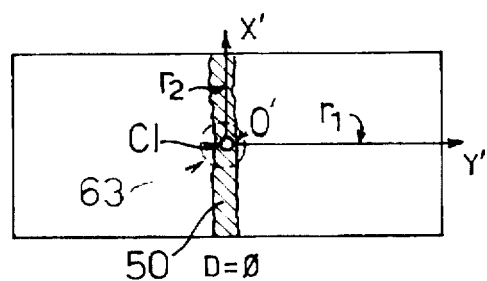
Fig. 7b
Fig. 7c
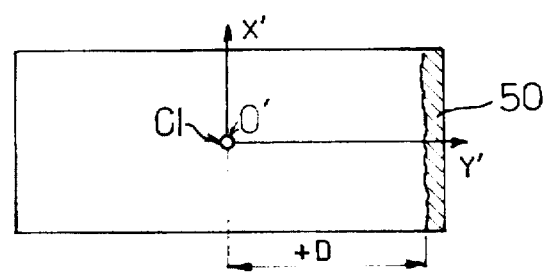
Fig. 7d

VIEWING DEVICE AND METHOD FOR THREE-DIMENSIONAL NONCONTACTING MEASUREMENTS

BACKGROUND OF THE INVENTION

The present invention relates to a viewing device and method for three-dimensional noncontacting measurements.

Measuring systems are known featuring at least one tracer movable in a three-dimensional measuring space, connected to a number of transducers for determining the location of the tracer in relation to a cartesian reference system, and which contacts the surfaces of an object to determine its dimensions.

Noncontacting measuring systems are also known, which feature viewing devices (e.g. television cameras) cooperating with computing devices for processing the image and so determining the dimensions of the object picked up by the viewing device.

Noncontacting measuring systems present a number of advantages as compared with contact systems. In particular:

noncontacting measuring systems provide for faster measurement as compared with contact systems, wherein measurements are made in a number of steps by setting the tracer to a number of different contact positions;

noncontacting measuring systems provide for measuring very small gaps (e.g. in vehicle bodies), which are either impossible or difficult to measure using contact systems, when the tracer is larger than the gap or cannot be positioned easily;

noncontacting measuring systems provide for measuring deformable materials without deforming them in the process.

On the other hand, noncontacting measuring systems are not as accurate as contact systems.

What is more, by featuring viewing devices that cannot be oriented in a three-dimensional space, known noncontacting measuring systems have few degrees of freedom, so that measurements can only be made in a few directions in space.

SUMMARY OF THE INVENTION

It is an object of the present invention to provide a viewing device and method for effecting noncontacting measurements, and which provides for overcoming the drawbacks typical of known systems.

More specifically, it is an object of the present invention to provide a calibration procedure for determining the orientation and location in space and the overall optical characteristics of the viewing device, and so enabling measurements in any direction within a three-dimensional space.

According to the present invention, there is provided a viewing device and method for three-dimensional noncontacting measurements, as claimed in claims 1 and 8.

BRIEF DESCRIPTION OF THE DRAWINGS

A preferred, non-limiting embodiment of the present invention will be described by way of example with reference to the accompanying drawings, in which:

FIG. 4 shows, schematically, the measuring principle of the device according to the present invention;

FIGS. 7a, 7b, 7c, 7d show images picked up by the viewing device according to the present invention.

DETAILED DESCRIPTION OF THE INVENTION

Figure 1:
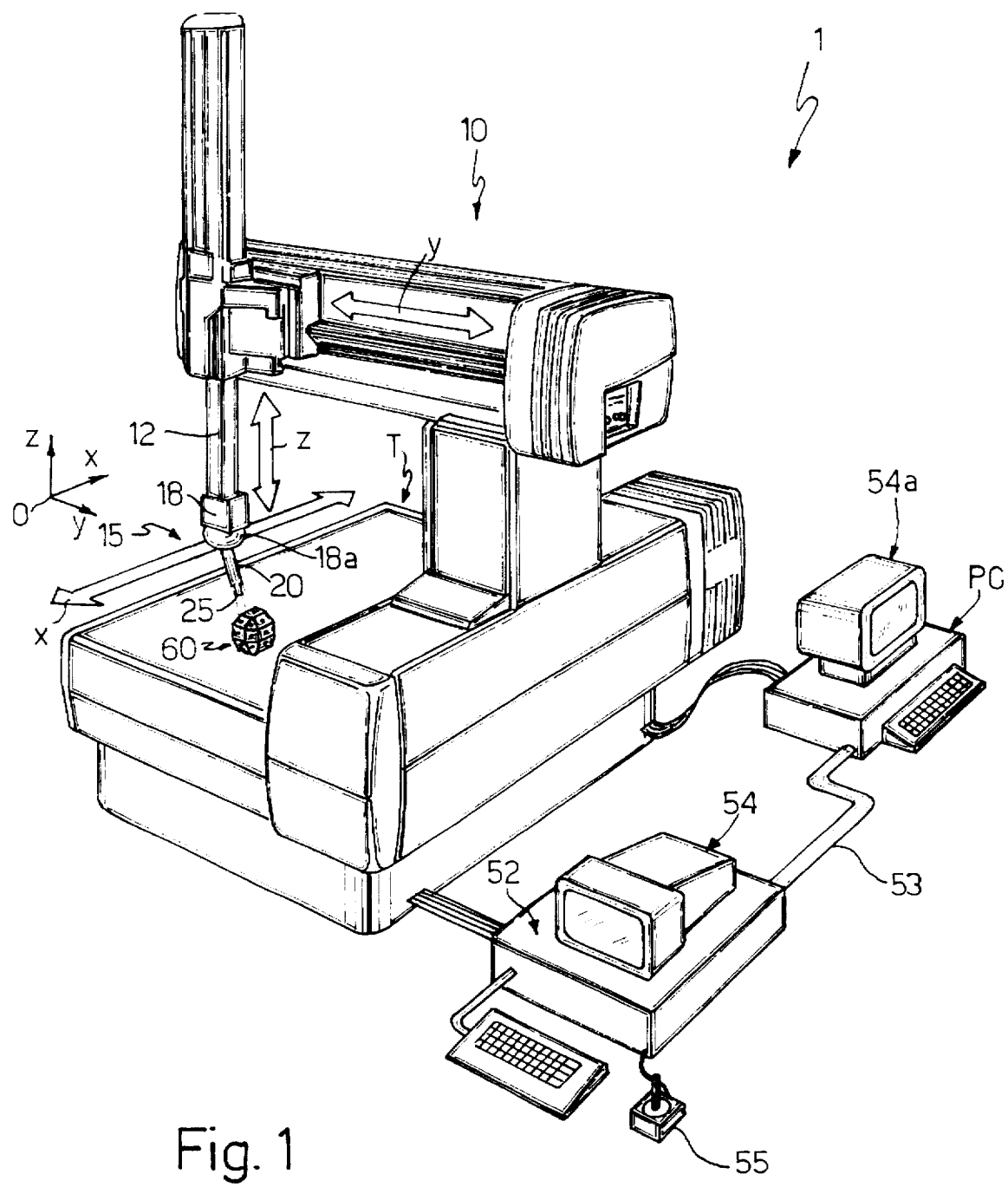
FIG. 1 shows a schematic view of a measuring machine employed in a viewing device in accordance with the teachings of the present invention.

Number 1 in FIG. 1 indicates a viewing device for effecting three-dimensional noncontacting measurements, and wherein a known measuring machine 10, e.g. a movable gantry type, presents an element (column) 12 which is movable by actuators (not shown) within a three-dimensional space T and in three coordinate directions X,Y,Z perpendicular to one another.

Measuring machine 10 therefore presents an X,Y,Z reference system with an origin O, and comprises known electronic measuring transducers (not shown) for determining the X,Y,Z position of movable element 12 in relation to origin O of the X,Y,Z reference system.

Figure 2A:
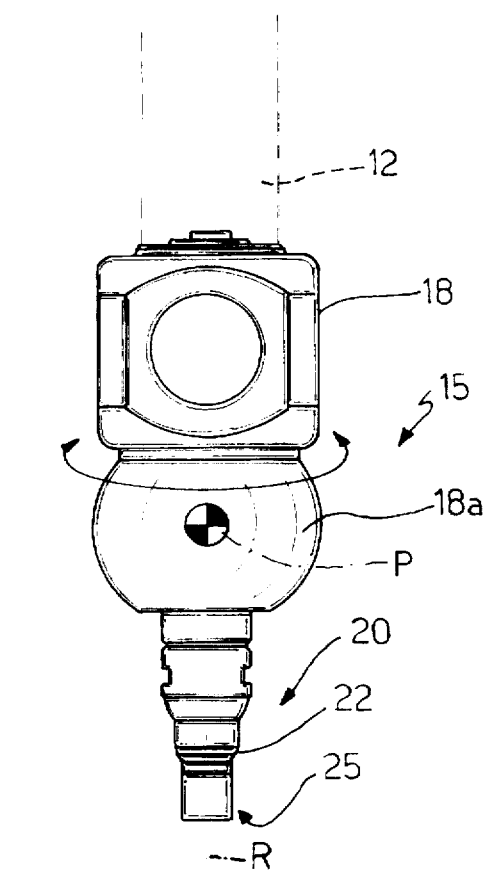
FIGS. 2a, 2b show a detail of the FIG. 1 machine in two different operating positions.
Figure 2B:
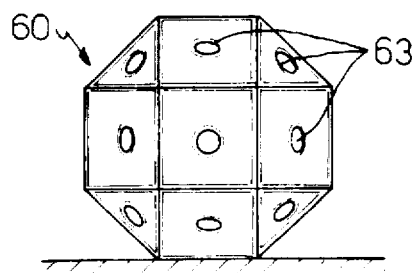
Figure 2B:
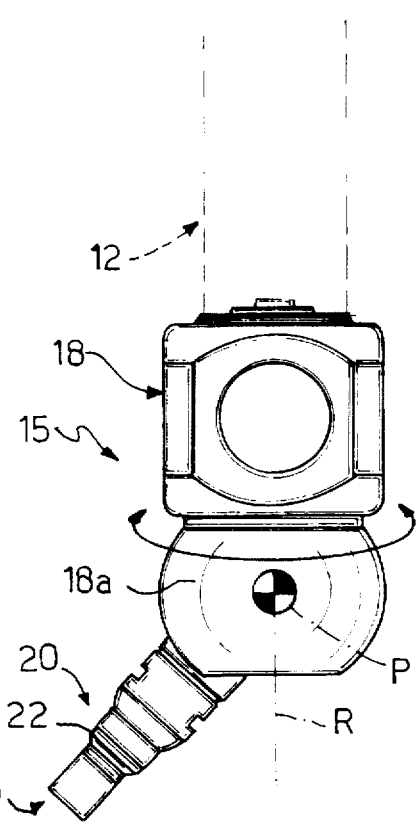
Figure 2B:
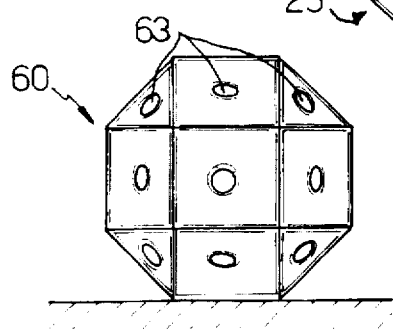

Measuring device 1 also comprises a known measuring head 15 fittable to movable element 12. More specifically, measuring head 15 comprises a first body 18 which is fitted stably to movable element 12; and a second body 20 (FIGS. 2a, 2b) which is axially symmetrical and movable in relation to first body 18. More specifically, second body 20 presents a first end portion hinged to a movable end portion 18a of first body 18 and therefore rotatable about a substantially horizontal axis indicated by P in FIGS. 2a, 2b (PITCH angle). Movable end portion 18a may also rotate, in relation to column 12, about its own axis of symmetry R (ROLL angle).

The PITCH and ROLL angles vary in discrete manner, so that the number of possible PITCH and ROLL angles is a finite number.

Measuring head 15 therefore presents two "degrees of freedom" respectively comprising the above ROLL and PITCH rotations.

Body 20 presents a second end portion in turn presenting a connecting device 22 (shown schematically) for assembling a viewing sensor 25 (shown schematically) or conventional tracers.

Figure 3:
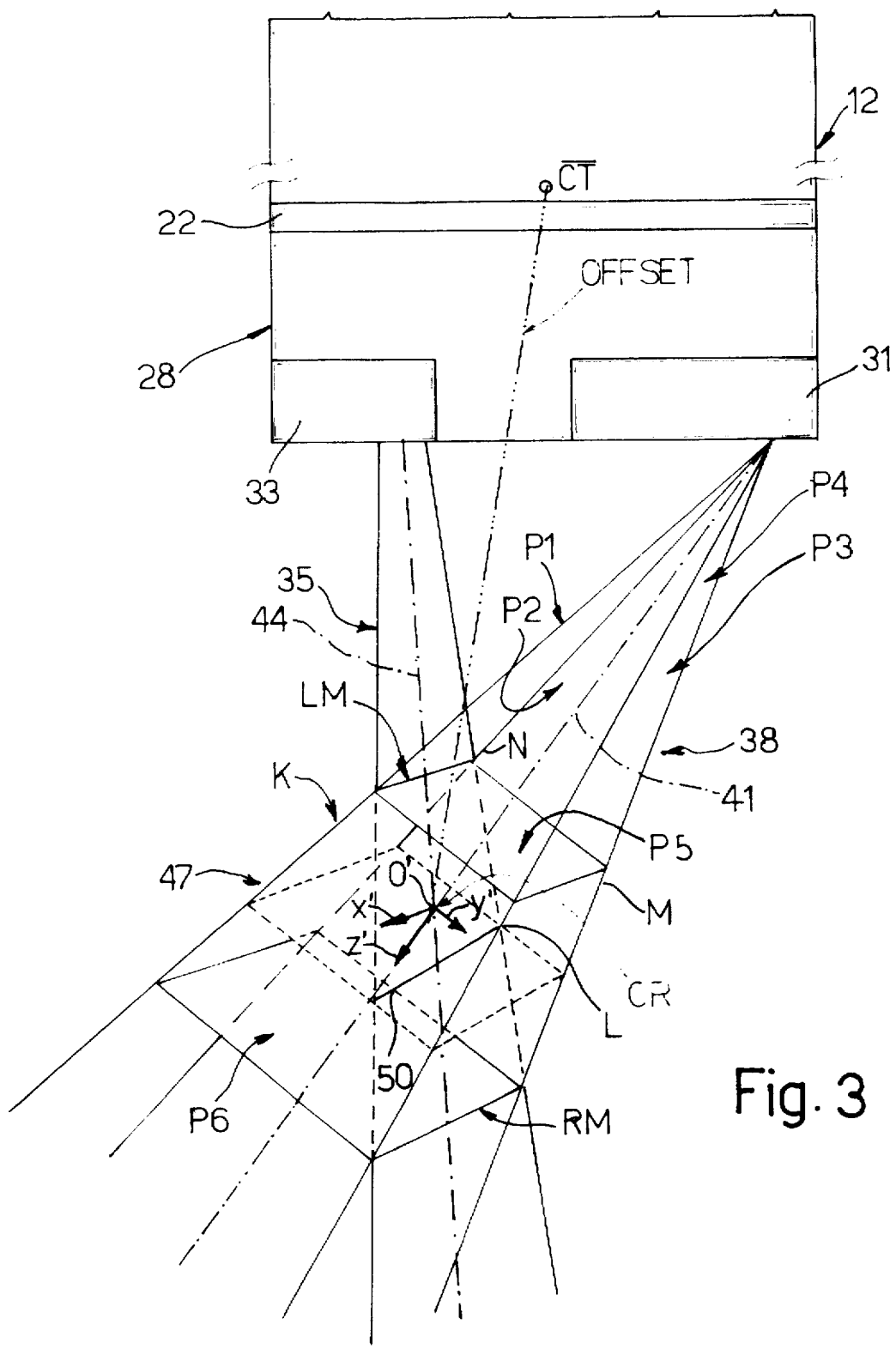
FIG. 3 shows, schematically, the model employed to describe the optical device of the viewing device according to the present invention.

With reference to FIG. 3, viewing sensor 25 comprises an outer casing 28, which is c onnected to con necting device 22, and which h ouses a television camera 31 (shown schematically) and a source 33 of a laser beam 35. Camera 31 covers a three-dimensional space 38 shown in FIG. 3 by a pyramid-shaped solid angle with its vertex at the lens (not shown) of camera 31. Solid angle 38 presents an optical axis 41 (shown by the dot-and-dash line), and is defined by four planes P1, P2, P3, P4, which intersect to define four edges K, L, M, N (shown by straight lines) of solid angle 38.

Laser beam 35 presents an axis of symmetry 44 (indicated by the dot-and-dash line) intersecting three-dimensional space 38; and the intersection of axes 44 and 41 is indicated CR (reference center).

The intersection of laser beam 35 and solid angle 38 defines a measurability space 47 in the form of a truncated pyramid defined laterally by portions of planes P1, P2, P3, P4 and by rectangular base planes P5 and P6 perpendicular to axis 41. More specifically, plane P5 presents a straight edge LM defined by the intersection of beam 35 and plane P1, and plane P6 presents a straight edge RM defined by the intersection of beam 35 and plane P3 opposite plane P1.

FIGS. 7b, 7c, 7d show a number of images to demonstrate the operating principle of viewing sensor 25. FIGS. 7b, 7d show respective images picked up by camera 31 of a flat object (e.g. a metal plate, not shown) coplanar with planes P5 and P6, and which show a line 50 (laser line) defined by the intersection of beam 35 and the object itself.

More specifically, laser line 50 is located at the left side edge of the image in FIG. 7b, and at the right side edge of the image in FIG. 7d. If the flat object is positioned coplanar with a plane through point CR and perpendicular to axis 41, laser line 50 is located halfway along the image (FIG. 7c).

The location of laser line 50 within the image, and hence the distance D between laser line 50 and the center CI of the image, depends on the location of the object along axis 41 and hence the distance of the object from camera 31.

By measuring distance D in the image picked up by the camera, it is therefore possible, by means of known trigonometric calculations, to determine the real distance of the object from the camera.

Viewing sensor 25 presents an internal X',Y',Z' reference system with an origin O' at reference center CR and the Z' axis aligned along axis 41 (FIG. 3).

More specifically, in the rectangular two-dimensional image picked up by camera 31, axes X', Y' may be oriented coplanar with the image plane, and with origin O' at the center CI of the image (FIGS. 7b–7d). Though axis Z' is therefore not detectable directly in the image, its location is determined with the aid of laser line 50 as stated previously.

Device 1 (FIG. 1) also comprises a central processing unit 52 conveniently comprising a VAX microcomputer, which communicates with measuring machine 10 (by which it is supplied with the measurement of the location of element 12) and with viewing sensor 25. More specifically, sensor 25 is connected to an image processing PC computer (e.g. a PC 486), which is connected by a DECNET network 53 to unit 52 to supply the three-dimensional information picked up within measurability space 47.

Also provided are a video terminal 54 connected to unit 52 to interface with the measuring machine, and a video terminal 54a connected to the PC to display the image and enter characteristic parameters of the sensor.

For it to operate, device 1 requires a number of so-called intrinsic and extrinsic calibration parameters.

The intrinsic parameters describe the internal performance of and are intrinsic to viewing sensor 25.

Camera 31 in fact supplies a two-dimensional image (FIGS. 7a–7d) comprising a rectangular matrix of (e.g. 500×582) pixels, and wherein the information relative to the location (i.e. the distance) of the object along axis Z' is determined indirectly by measuring and processing the distance value D of laser line 50 from center CI of the image as stated previously.

The real dimensions of the object (along X', Y') are determined directly by examining corresponding dimensions in the image and converting them by means of an appropriate scale factor.

Each pixel in the image picked up by camera 31 therefore corresponds to an actual dimension (in millimeters) which is a function of the distance of the object from camera 31. That is, a real dimension of the object (along X' or Y') is related to the dimension picked up in the image, via a scale factor which is a function of the distance along Z':

real dimension (in mm) =pixel dimension* f(Z') where f(Z') is defined by a set of intrinsic parameters.

The extrinsic parameters relate viewing sensor 25 to the measuring volume of measuring machine 10.

Viewing sensor 25 in fact generates measurements relative to the X'Y'Z' reference system within measurability space 47, and which are related to the X,Y,Z reference system of machine 10 by means of extrinsic parameters.

More specifically, device 1 uses:

a first set of extrinsic parameters defined by the rotation matrix ROT-MAT relating the X,Y,Z to the X',Y',Z', reference frame;

a second set of extrinsic parameters, which describes the CT-CR or so-called OFFSET vector (where CR is the origin of the X'Y'Z' reference system, and CT the center of the movable element 12 (FIG. 3)).

The above extrinsic parameters are calculated for each possible orientation of measuring head 15.

FIG. 4 shows the relationship between the various systems of reference, to clarify the operation of device 1 and how the intrinsic and extrinsic parameters are used to effect the measurement.

More specifically, FIG. 4 shows the Cartesian X,Y,Z reference frame of measuring machine 10; the X',Y',Z' reference system of viewing sensor 25; the OFFSET vector extending between origin O' of the X'Y'Z' reference system and the center CT of the head of movable element 12; the vector CTPOS extending between origin O of the X,Y,Z reference system and head center CT; and the vector V extending between origin O of the X,Y,Z reference system and origin O' of the X',Y',Z' reference system.

For any given point P in space, viewing sensor 25 supplies a measurement expressed by a vector m' relative to and oriented in relation to the X',Y',Z' Cartesian reference frame, and which must be related to the X,Y,Z reference system.

For this purpose, by means of rotation matrix ROT-MAX, the device according to the present invention converts the vector m1 picked up by viewing sensor 25 according to the equation m=ROT-MAT(mv) to generate a vector m oriented according to the X,Y,Z reference system.

Vector V must also be added to vector m to relate the measurement of point P to the X,Y,Z reference system and obtain a measurement M of point P relative to X,Y,Z, i.e. M=m+V.

V ector V is calculated by add ing th e OFFSET vector to the CTPOS vector. More specifically, the CTPOS vector is supplied by the transducers (not shown) located along the three axes of machine 10 (and describes the location of the center CT of the head of movable element 12 in relation to the X, Y,Z reference system) , and the OFFSET vector, as stated, is one of the extrinsic parameters.

A description will now be given of the calibration operations performed by the device according to the present invention to define the intrinsic and extrinsic parameters.

The calibration operations are performed with the aid of a prismatic gauge.

Figure 5A:
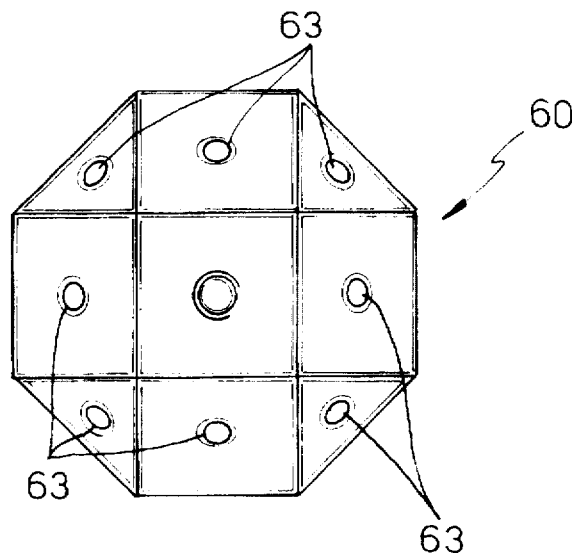
FIGS. 5a, 5b, 5c show three views of a prismatic gauge used for calibrating the device according to the present invention.
Figure 5B:
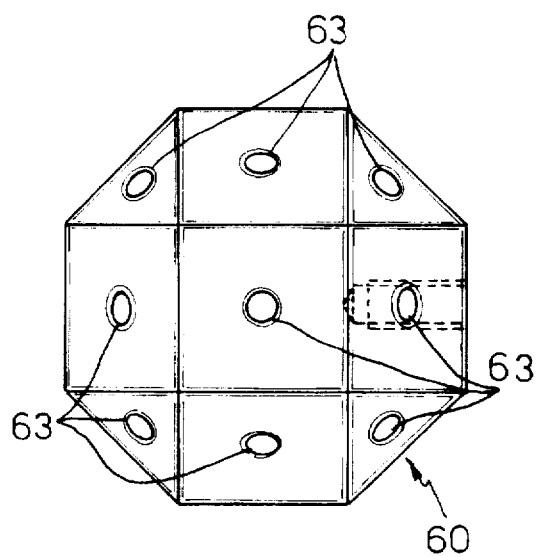
Figure 5C:
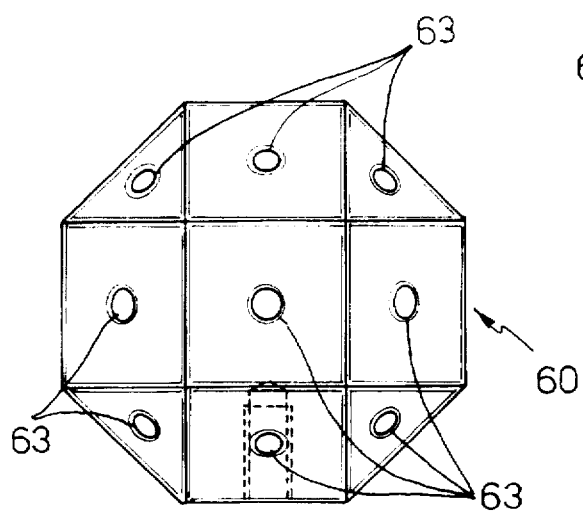

Figures 5a, 5b, 5c show a preferred embodiment of the gauge 60 according to the present invention.

Gauge 60 pre sent s cross sections defined by regular octagons, and is defined by twenty-six flat lateral walls. More specifically, gauge 60 comprises eighteen square walls and eight triangular walls.

Each square and triangular wall presents a central circular dead hole 63 for the purpose described later on.

To perform the calibration operations, gauge 60 is placed on measuring machine 10, and a preliminary measuring step (block 98 in FIG. 6a) is performed to measure the arrangement of gauge 60 in relation to the X,Y,Z reference system of machine 10. At the preliminary measuring step, the positions of holes 63 and the orientation of the faces of the prismatic gauge in relation to the X,Y,Z reference system of machine 10 are determined.

The preliminary measuring step is performed using a known mechanical tracer (not shown) fitted to connecting device 22.

At the end of the preliminary measuring step, the mechanical tracer (not shown) is removed and head 15 fitted with viewing sensor 25 (block 99 downstream from block 98).

Figure 6A:
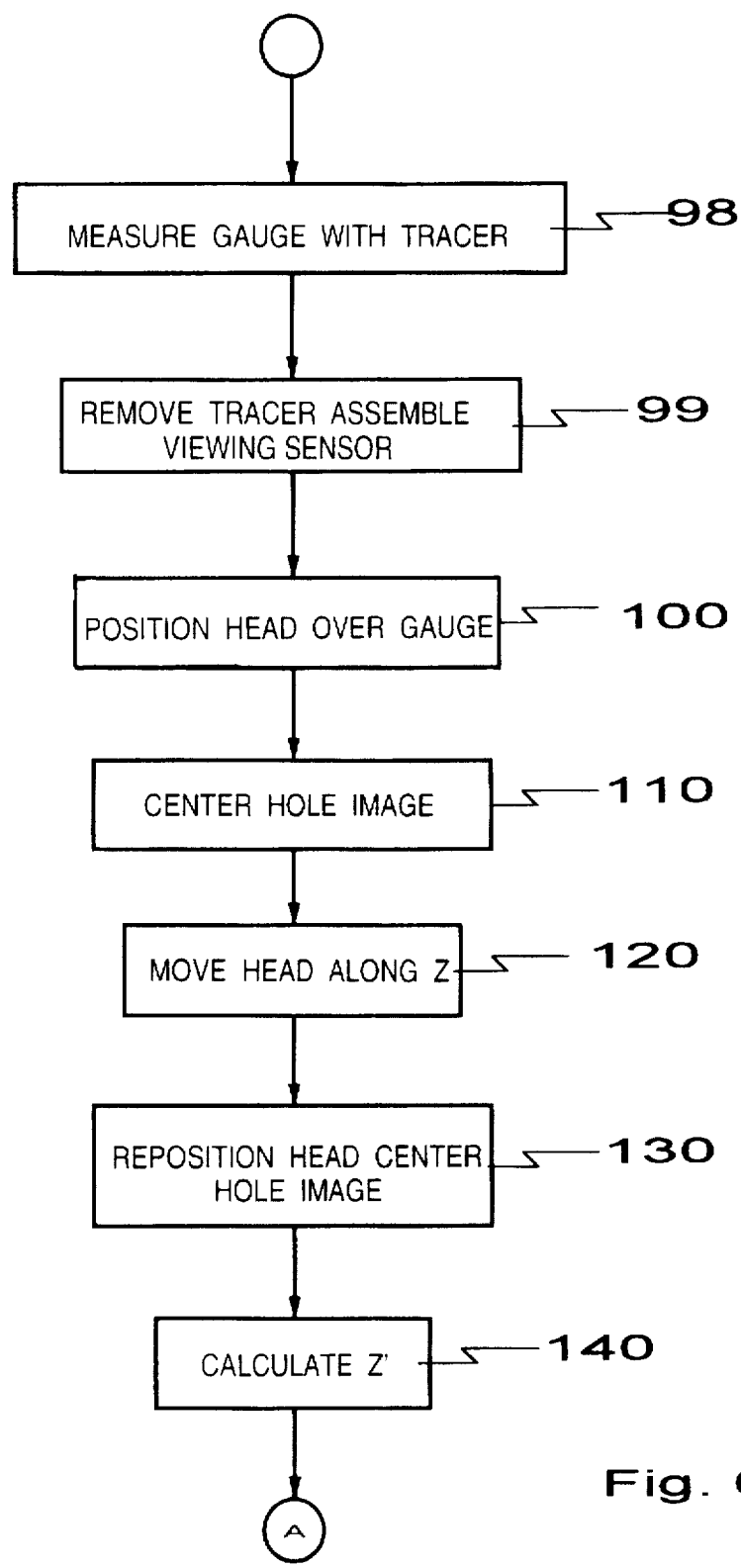
FIGS. 6a, 6b, 6c, 6d show steps in the calibration of the device according to the present invention.
Figure 6B:
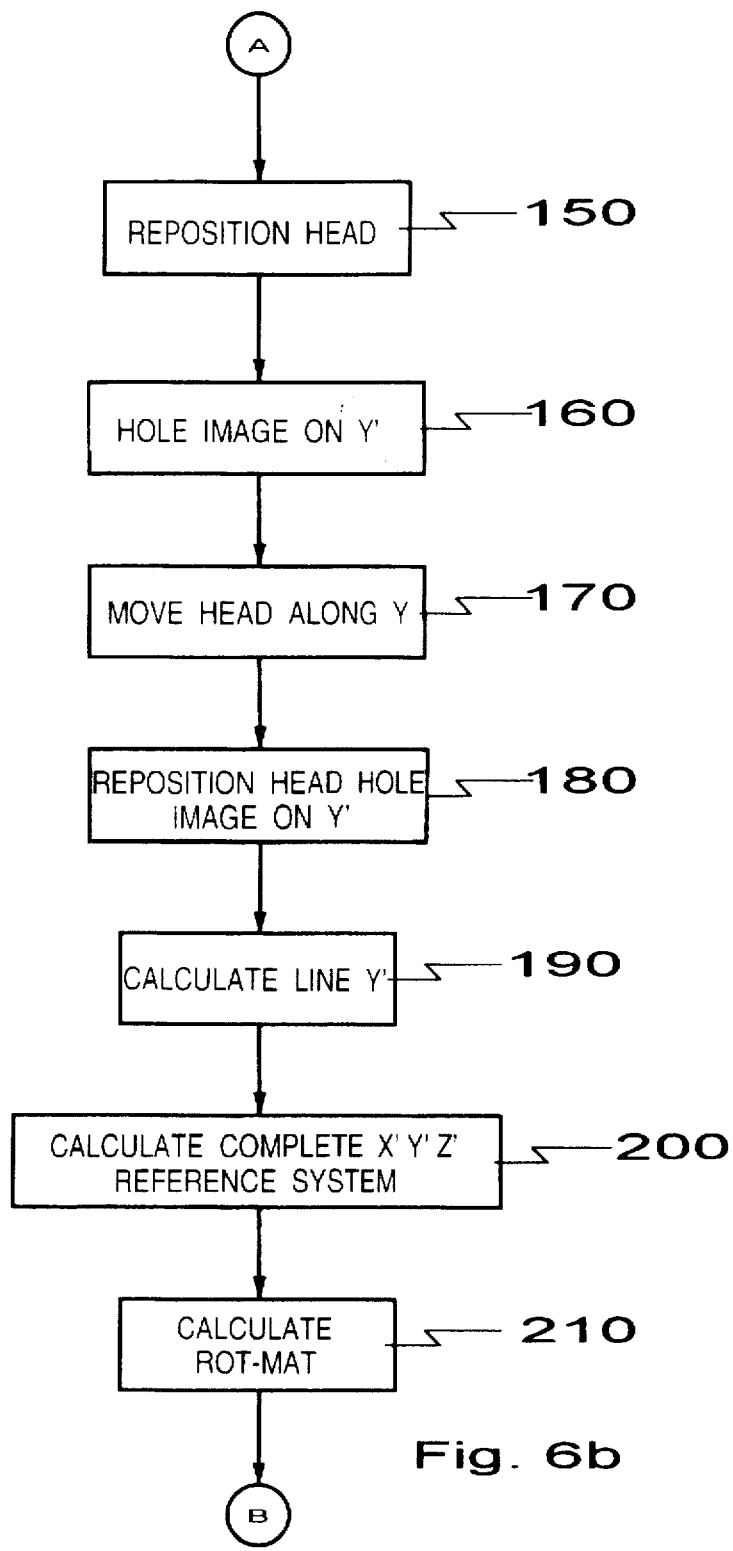

With reference to FIGS. 6a and 6b, a description will now be given of the operations performed by the device according to the present invention to calculate extrinsic parameters relative to the definition of the ROT-MAT matrix. In the following description, reference will be made to the image I (also referred to as image plane) picked up by camera 31 and shown on video terminal 54a.

With reference to FIG. 7a, image I comprises a rectangular dot matrix defined by a rectangular contour; and, within image I, a central point (image center) CI is definable through which the Z' axis of the X',Y',Z' reference system passes.

Also definable within image I are a straight line ri parallel to the long sides of the image and corresponding to the Y' axis; and a straight line r2 parallel to the short sides of the image and corresponding to the X' axis. Lines r1 and r2 intersect at image center CI.

To begin with (block 100 downstream from block 99), the operator, using a joystick 55 (FIG. 1), positions measuring head 15 over gauge 60, with camera 31 facing a face of gauge 60 oriented in Z, during which operation, the ROLL and PITCH angles are zero.

Camera 31 is thus oriented, and picks up a hole 63 in the image plane.

Block 100 is followed by block 110 in which an automatic procedure is enabled to reposition measuring head 15 at a position p1 (in relation to X,Y,Z) so that the center of the image of hole 63 is located exactly at image center CI, in which position, axis Z' passes exactly through the center of the hole.

Block 110 is followed by block 120 in which head 15 is moved along axis Z of measuring machine 10, so that, since the axis of machine 10 does not coincide with axis Z' of sensor 25, the hole image moves away from the center of the image plane.

Block 120 is followed by block 130 in which an automatic procedure is enabled to reposition measuring head 15 at a position p2 (in relation to X,Y,Z) so that the center of the hole image is located exactly at image center CI, in which position, axis Z' passes exactly through the center of the hole.

Block 130 is followed by block 140 in which is calculated the line (relative to X,Y,Z) through points p1 and p2, and which corresponds to axis Z'.

Block 140 is followed by block 150 (FIG. 6b) in which measuring head 15 is repositioned automatically, so that, in the image picked up by camera 31, the hole is located close to axis Y' (line rl).

Block 150 is followed by block 160 in which an automatic procedure is enabled to reposition head 15 at a position p3 so that the center of the hole image is located exactly on axis Y', in which position, axis Y' passes exactly through the center of the hole.

Block 160 is followed by block 170 in which head 15 is moved in relation to axis Y, so that the hole image moves away from axis Y'.

Block 170 is followed by block 180 in which an automatic procedure is enabled to reposition measuring head 15 at a position p4, so that the center of the hole image is located exactly on axis Y', in which position, axis Y' passes exactly through the center of the hole.

Block 180 is followed by block 190 in which is calculated the line (relative to the X,Y,Z system) through points p3 and p4, and which corresponds to axis Y'.

Block 190 is followed by block 200 in which, given axes Z' and Y', axis X' perpendicular to them, and hence the complete reference system (X',Y',Z'), is defined.

Block 200 is followed by block 210 in which is calculated in known manner the ROT-MAT matrix expressing the rotation relationship between the X,Y,Z and X',Y',Z' reference frames.

Figure 6C:
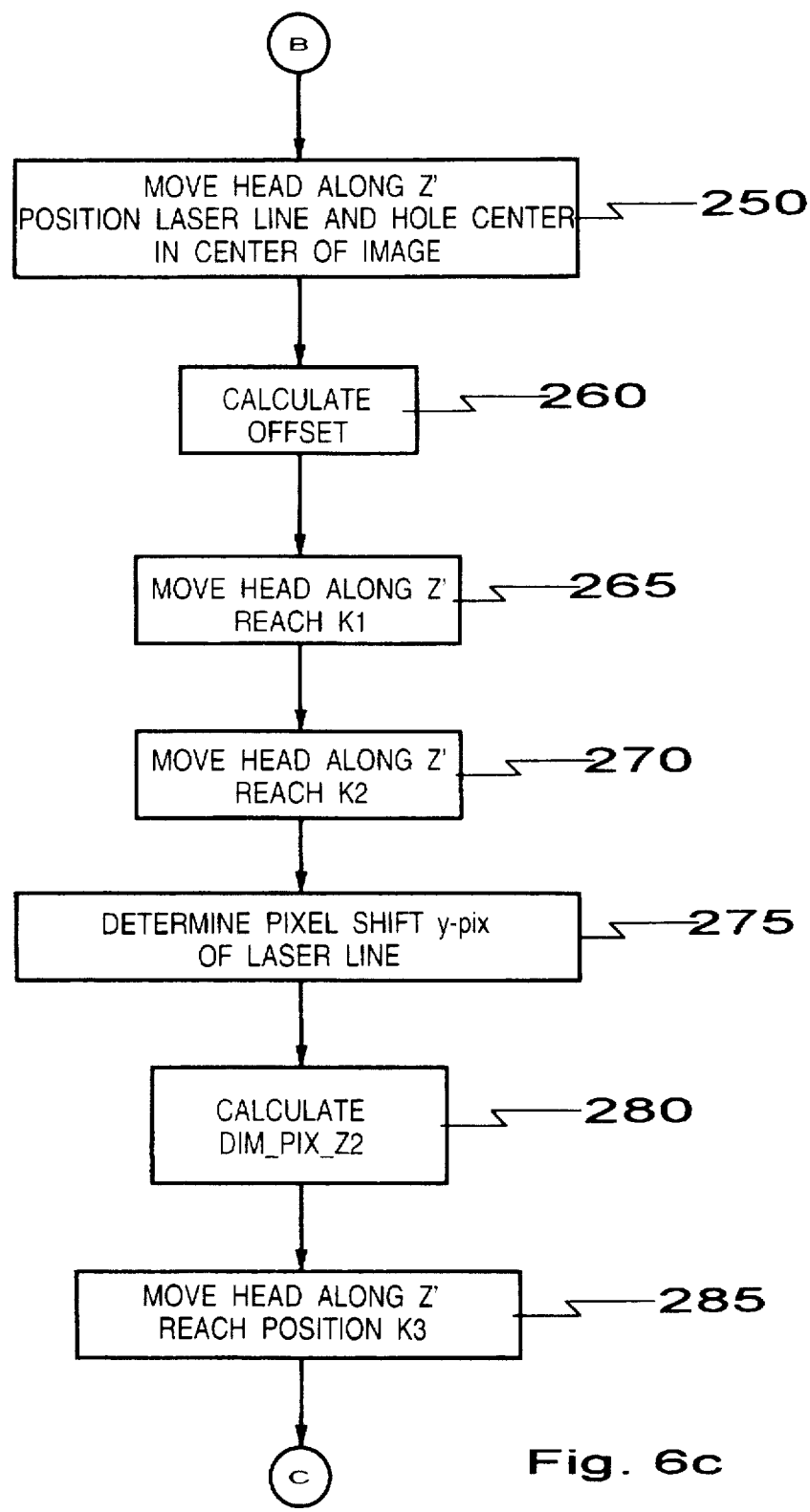
Figure 6D:
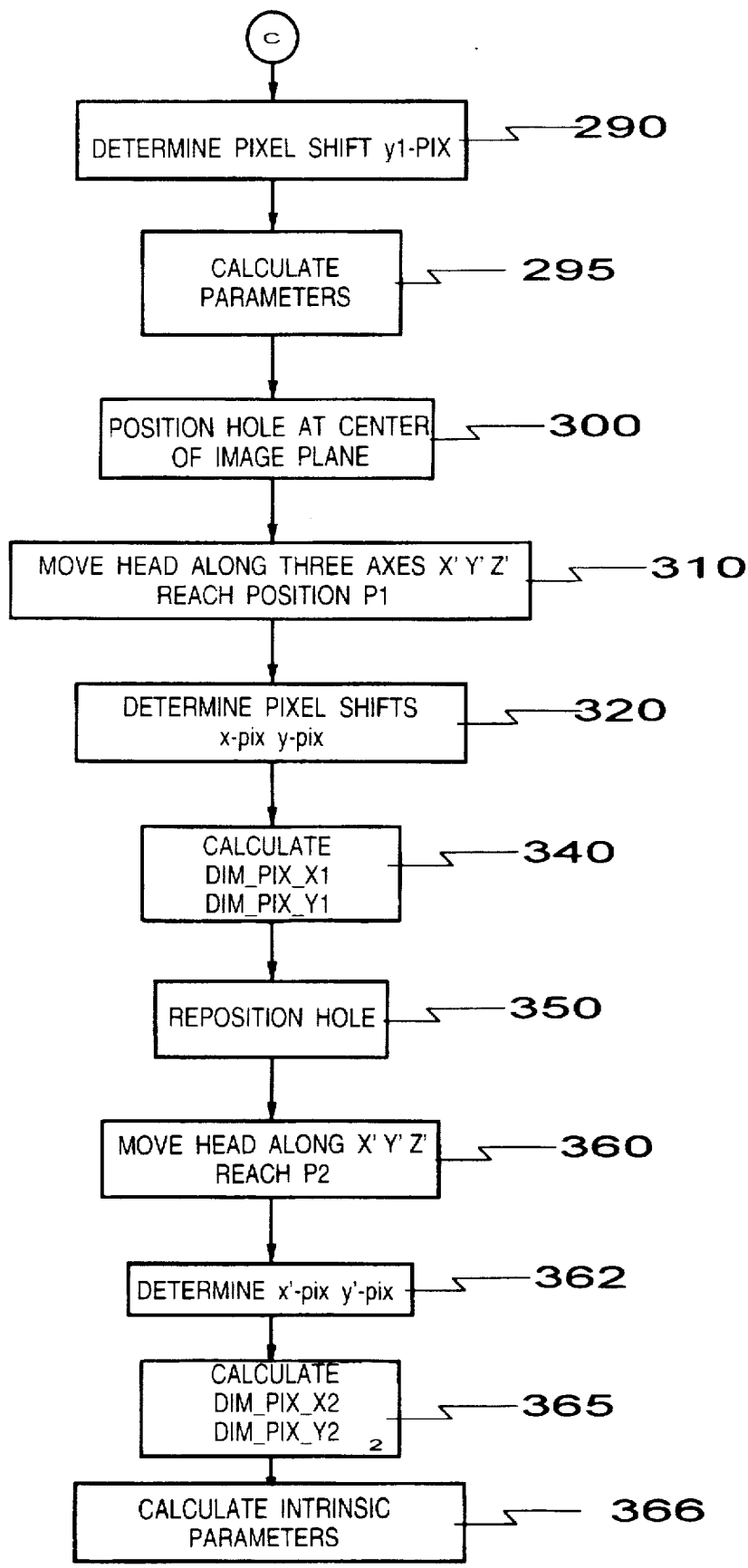

With reference to FIGS. 6c and 6d, a description will now be given of the operations performed by the device according to the present invention to calculate extrinsic parameters relative to the definition of the OFFSET vector.

To begin with (block 250 downstream from block 210), device 1 enables an automatic procedure to move measuring head 15 along axis Z' (now known, since the X',Y',Z' reference frame has been calculated) until laser line 50 is located exactly at the center of the image plane, and the center of the hole is located exactly at the center CI of the image (FIG. 7c). In this position, p5, the origin of the X',Y',Z' system is located exactly at the center of the hole projected onto the face of the prism. The position of the center of the hole (in relation to X,Y,Z), however, is known, being obtained by a previous set of measurements (block 98), whereas the position of the center CT of the head (in relation to X,Y,Z) is determined directly by machine 10. The OFFSET vector may thus be calculated (block 260 downstream from block 250) according to the equation:

OFFSET=position p5 - position of head center CT

With reference to FIG. 6c, a description will now be given of the operations performed to calculate the intrinsic parameters.

To begin with (block 265 downstream from block 260), the laser line is positioned at the center of the image plane by moving measuring head 15 along axis Z' to reach position K1(X1,Y1,Z1).

Block 265 is followed by block 270 in which a +deltaZ' movement is imparted to head 15 along axis Z' to reach position K2(X2,Y2,Z2).

Block 270 is followed by block 275 for determining the shift in pixels, y-pix, of the laser line in the image plane in relation to the initial position established in block 265.

Block 275 is followed by block 280 in which a DIM_PIX_Z2 parameter is calculated according to the equation:

$$DIM\_PIX\_Z2 = deltaZ'/y\text{-pix}$$

Block 280 is followed by block 285 in which a -deltaZ' movement is imparted to head 15 along axis Z' to reach position K3(X3,Y3,Z3).

Block 285 is followed by block 290 for determining the shift in pixels, y1-pix, of the laser line in relation to the initial position established in block 265.

Block 290 is followed by block 295 in which the intrinsic parameters are calculated:

DIM_PIX_Z1=deltaZ'/y1-pix

Y_PIX_REFER=y1-pix

PIX_Z_CST_ADD=DIM_PIX_Z1

PIX_Z_CST_MUL=(DIM_PIX_Z2−DIM_PIX_Z1)/(y-pix-y1-pix)

The relationship between the physical dimension in Z' in the reference system of viewing sensor 25 and the detected number of pixels is a function of the intrinsic parameters calculated in block 295 according to the equation:

Z'=y-pix * |PIX_Z_CST_ADD+ (y-pix-Y_PIX_REFER) * PIX_Z_CST_MUL|

Block 295 is followed by block 300 in which the hole image is positioned exactly in the center of the image plane (initial position) by moving measuring head 15 along axis Z' to reach a position P3(X3,Y3,Z3).

Block 300 is followed by block 310 in which head 15 is moved along the three axes to reach a position P1(X1,Y1, Z1).

Block 310 is followed by block 320 in which are determined the hole image shifts in pixels, x-pix, y-pix, along X' and Y' and in relation to the initial position P3 established in block 300.

Block 320 is followed by block 340 in which the following parameters are calculated:

DIM_PIX_X1=|X3−X1|/(x-pix)

DIM_PIX_Y1=|Y3−Y1|/(y-pix)

Block 340 is followed by block 350 in which a hole image is positioned at the center of the image plane by moving measuring head 15 along axis Z'.

Block 350 is followed by block 360 in which head 15 is moved along the three axes to reach a position P2(X2,Y2, Z2).

Also determined are the hole image shifts in pixels, x1-pix, y1-pix, along X' and Y' and in relation to position P2 established in block 350 (block 362 downstream from block 360).

Block 362 is followed by block 365 in which the following parameters are calculated:

DIM_PIX_X2=|X2−X3|/(x'-pix)

DIM_PIX_Y2=|Y2−Y3|/(y'-pix)

Block 365 is followed by block 366 in which the following quantities (intrinsic parameters) are defined:

DELTA_ZP_REFER=(Z2−Z3)

PIX_X_CST_MUL=(DIM_PIX_X1−DIM_PIX_X2)/(Z1−Z2)

PIX_X_CST_ADD=DIM_PIX_X2

PIX_Y_CST_MUL=(DIM_PIX_Y1−DIM_PIX_Y2)/(Z1−Z2)

PIX_Y_CST_ADD=DIM_PIX_Y2

The above quantities form the intrinsic parameters, and, given the x-pix, y-pix coordinates in pixels of the point in the image and the location of the point along Z', provide for determining the actual X' Y' coordinates of the point according to the equations:

X'=x-pix*|PIX_X_CST_ADD+(Z'-DELTA_ZP_REFER)*PIX_X_CST_MUL|

Y'=y-pix*|PIX_Y_CST_ADD+(Z'-DELTA_ZP_REFER)*PIX_Y_CST_MUL|

For all the other inclinations of measuring head 15 (all the possible PITCH and ROLL angle combinations in which these angles are other than zero), the above operations are only repeated to calculate the extrinsic parameters (OFFSET and ROT-MAT).

To do this, other faces of gauge 60 are used, in particular, the face whose perpendicular comes closest to the orientation of sensor 25 for the set PITCH and ROLL angles.

The advantages of the present invention will be clear from the foregoing description. By virtue of the intrinsic and extrinsic parameter calculating procedures, device 1 provides for determining the orientation and location of the viewing device in space (extrinsic parameters) and the overall optical characteristics of the viewing device (intrinsic parameters) to enable measurements to be made in any direction in a three-dimensional space.

I claim:

1. A three-dimensional noncontacting measuring device, characterized by comprising:

a measuring machine (10) presenting a movable element (12) movable in a three-dimensional measuring space (T);

said measuring machine (10) presenting means for determining a first vector (CTPOS) defining the position of a reference point (CT) of said movable element (12) in relation to a first reference system of the measuring machine (10) itself and defined by a first cartesian reference frame (X,Y,Z) comprising perpendicular coordinate X,Y,Z axes;

a viewing sensor (25) of a measuring head (15) fitted to said movable element (12);

said measuring head (15) presenting positioning means (18) for orienting said viewing sensor (25) in said measuring space (T);

said viewing sensor (25) comprising at least a television camera (31) and a source (33) of a laser beam said television camera (31) covering a three-dimensional space (38), in particular a space in the form of a solid angle and presenting an optical axis (41);

said laser beam (35) presenting an axis of symmetry (44) intersecting said three-dimensional space (38);

the intersection of said optical axis (41) and said axis of symmetry (44) defining the origin of a second Cartesian reference frame (X',Y',Z') forming part of a second reference system of said viewing sensor;

said second Cartesian reference frame comprising perpendicular coordinate X',Y',Z' axes, one axis (Z') of which is oriented along said optical axis (41);

said television camera (31) picking up a two-dimensional image defining an image plane, at the center (CI) of which is definable a point corresponding to the origin of said second reference system located with first and second coordinate axes (Y', X') perpendicular to each other and in the image plane;

said viewing sensor (25) supplying, for a point (P) in the measuring space, a measurement expressed by a measuring vector (m') relative to and oriented in relation to said second reference system (X',Y',Z');

said device (1) comprising calculating means for calculating a number of extrinsic parameters, including:

at least an OFFSET vector extending from the origin (O') of said second reference system (X',Y',Z') to said reference point (CT) of said movable element (12); said OFFSET vector being defined for at least a first arrangement of said positioning means;

at least a rotation matrix (ROT-MAT) defining the relationships between said first Cartesian reference frame (X,Y,Z) and said second Cartesian reference frame (X',Y',Z');

said device (1) comprising calculating means for calculating a second vector (V) expressing the distance between the origins of said first and said second reference system;

said second vector (V) being calculated on the basis of said first vector and said OFFSET vector;

said device (1) presenting vectorial calculating means for calculating a correct measurement (m) by relating said measurement vector (m') to said first reference system via said rotation matrix; and said vectorial calculating means relating said correct measurement (M=m+V) to said first reference system by means of said second vector (V).

2. A device as claimed in claim 1, characterized in that said calculating means for calculating said rotation matrix comprise:

preliminary measuring means (98) for performing a cycle of initial calculating operations wherein a gauge (60) is placed on the measuring machine (10), and the positions of reference elements of the gauge (60) in relation to the first reference system (X,Y,Z) are measured;

said gauge (60) presenting a number of faces, each of which presents a central reference element (63);

positioning means (100) for positioning said viewing sensor facing a face of the gauge (60) and oriented according to a selected axis (Z) of the first cartesian reference frame;

said television camera (31) picking up a reference element (63) in the image plane;

first repositioning means (110) for enabling an automatic procedure by which said measuring head (15) is repositioned in a first position (p1) so that the center of the image of the reference element is located exactly at the image center (CI) and the Z' axis of the second Cartesian reference frame passes exactly through the center of the reference element;

first shift means (120) wherein a movement along the selected axis (Z) of the measuring machine (10) is imparted to said measuring head (15); said movement causing the image of the reference element to move away from the center of the image plane;

second repositioning means (130) wherein an automatic procedure is enabled to reposition said measuring head (15) in a second position (p2) so that the center of the image of the reference element is located exactly at the image center (CI); in which position, the Z' axis of the second reference system passes exactly through the center of the reference element;

first axis calculating means (140) for calculating a first line through the first and second positions (p1, p2) and relative to the first reference system; said first line corresponding to the Z' axis;

third repositioning means (150) wherein the measuring head (15) is repositioned automatically in such a manner that, in the image picked up by the television camera (31), the reference element is located close to the first coordinate axis Y';

fourth repositioning means (160) wherein an automatic procedure is enabled to reposition said measuring head (15) in a third position (p3) so that the center of the image of the reference element is located exactly on the first coordinate axis Y'; in which position, the Y' axis passes exactly through the center of the reference element;

second shift means (170) wherein a movement in relation to the Y axis of the first reference system is imparted to said measuring head (15); said movement causing the image of the reference element to move away from the Y' axis;

fifth repositioning means (180) wherein an automatic procedure is enabled to reposition the measuring head (15) in a fourth position (p4) so that the center of the image of the reference element is located exactly on the first coordinate axis Y'; in which position, the Y' axis passes exactly through the center of the reference element;

second axis calculating means (190) for calculating a second line relative to the first reference system (X,Y, Z) and through said third and fourth positions (p3, p4); said second line corresponding to the Y' axis;

third axis calculating means (200) wherein, given the Z' and Y' axes of the second reference system, the X' axis perpendicular to the Z' and Y' axes is calculated to fully define the second reference system (X',Y',Z');

final calculating means (210) for calculating said rotation matrix (ROT-MAT) expressing the rotation relationship between the X,Y,Z axes of the first reference system and the X',Y',Z' axes of the second reference system.

3. A device as claimed in claim 2, characterized in that said gauge (60) presents cross sections defined by regular octagons, and is defined by twenty-six flat lateral walls;

the gauge comprising eighteen square walls and eight triangular walls;

each square and triangular wall presenting, in the center, a circular dead hole (63) defining said reference element.

4. A device as claimed in claim 2, characterized in that said calculating means for calculating said OFFSET vector comprise:

sixth repositioning means (250) for enabling an automatic procedure by which the measuring head (15) is moved along the Z' axis of the second reference system (X', Y',Z') to a fifth position (p5) wherein a laser line (50), formed by the intersection of said beam (35) and a face of said gauge, is located exactly in the center of the image plane, and the center of the reference element is located exactly at the image center (CI);

said fifth position having been determined previously by said preliminary measuring means (98);

recalling means for reading the value of said fifth position (p5) in said first reference system;

vector calculating means (260) for calculating the OFFSET vector on the basis of the distance, relative to said first reference system, between the fifth position (p5) and the position of said reference point (CT) of said movable element (12) for which said fifth position is determined.

5. A device as claimed in claim 4, characterized in that said calculating means for calculating intrinsic parameters comprise:

calculating means for calculating a number of intrinsic parameters described in the internal performance of the viewing sensor and for correlating the dimensions of an object picked up in said two-dimensional image to the real dimensions of the object;

seventh repositioning means (265) for moving said measuring head along the Z' axis of said second reference system to reach a first initial position Kl(Xl,Yl,Z1) wherein the image of the reference element is located exactly at the center of the image plane;

third shift means (270) wherein the measuring head (15) is moved along the Z' axis to reach a first final position K2 (X2,Y2,Z2);

first image analyzing means (275) for determining, in said two-dimensional image, a first pixel shift (y-pix), along the Y' axis through the image plane, of the laser line formed by the intersection of said beam and said face of said gauge (60);

first parameter calculating means (280) for calculating a parameter on the basis of the first pixel shift (y-pix) and said first initial and final position;

eighth repositioning means (285) wherein said measuring head (15) is moved along the Z' axis to reach a second final position K3(X3,Y3,Z3);

second image analyzing means (290) for determining, in said two-dimensional image, a second pixel shift (yl-pix), along the Y' axis through the image plane, of the laser line from the X' axis;

second parameter calculating means (295) for calculating at least one intrinsic parameter on the basis of at least said first and second pixel shifts (y-pix, yl-pix).

6. A device as claimed in claim 5, characterized in that said calculating means for calculating intrinsic parameters comprise:

ninth repositioning means (300) for moving the measuring head (15) along the Z' axis of the second reference system to reach a first preliminary position P3(X3,Y3, Z3) in which the image of the reference element is located exactly in the center of the image plane;

tenth repositioning means (310) for moving the measuring head (15) along three axes to reach a first end position Pl(X1,Y1,Z1);

third image analyzing means (320) for determining, in said two-dimensional image, first pairs of pixel shifts (x-pix, y-pix) of the image of said reference element along two coordinate axes (X'and Y') through the image plane and relative to displacement between the first preliminary position and the first end position;

third parameter calculating means (340) for calculating a first number of parameters on the basis of said first pair of pixel shifts (x-pix, y-pix) and said first preliminary and end position;

eleventh repositioning means (350) wherein the image of a reference element is repositioned in the center of the image plane by moving the measuring head (15) along the Z' axis to reach a second preliminary position;

twelfth repositioning means (360) for moving the measuring head (15) along three axes to reach a second end position P2(X2,Y2,Z2);

fourth image analyzing means (362) for determining, in said two-dimensional image, second pairs of pixel shifts (x'-pix, y'-pix) of the image of said reference element along two coordinate axes (X'and Y') through the image plane and relative to displacement between the second preliminary position and the second end position;

fourth parameter calculating means (365) for calculating a second number of parameters on the basis of said second pairs of pixel shifts (x'-pix, y'-pix) and said second preliminary and end position;

means (366) for defining said intrinsic parameters as a function of said first and second number of parameters.

7. A device as claimed in claim 1, characterized by comprising calculating means for calculating a number of intrinsic parameters describing the internal performance of the viewing sensor (25) and for correlating the dimensions of an object picked up in said two-dimensional image to the real dimensions of the object.

8. A three-dimensional noncontacting measuring method, characterized by comprising the steps of:

determining a first vector (CTPOS) defining the position, in relation to a first reference system, of a reference point (CT) of a movable element (12) of a measuring machine (10);

said first reference system being of the machine (10) itself, and being defined by a first Cartesian reference frame (X,Y,Z) comprising perpendicular coordinate X,Y,Z axes;

determining, by means of a viewing sensor (25) fitted to a measuring head (15) of said movable element (12), a measuring vector (m') relative to a second reference system (X',Y',Z') of the viewing sensor (25) itself and defined by a second Cartesian reference frame (X',Y', Z');

calculating a number of extrinsic parameters, including:

at least an OFFSET vector extending from the origin (O') of said second reference system (X',Y',Z') to said reference point (CT) of said movable element (12);

at least a rotation matrix (ROT-MAT) defining the relationship between said first Cartesian reference frame (X,Y,Z) and said second Cartesian reference frame (X',Y',Z');

calculating a second vector (V) expressing the distance between the origins of said first and said second reference system;

said second vector (V) being calculated on the basis of said first vector and said OFFSET vector;

calculating a correct measurement (m) by relating said measuring vector (m') to said first reference system via said rotation matrix; and relating said correct measurement (M =m +V) to said first reference system by means of said second vector.

9. A method as claimed in claim 8, characterized by comprising the step of positioning said viewing sensor (25) in relation to said movable element (12) by orienting said viewing sensor (25) in a measuring space (T) of said measuring machine (10).

10. A method as claimed in claim 8, characterized in that said viewing sensor (25) comprises at least a television camera (31) and a source (33) of a laser beam (35);

said television camera (31) covering a three-dimensional space (38), in particular a space in the form of a solid angle and presenting an optical axis (41);

said laser beam (35) presenting an axis of symmetry (44) intersecting said three-dimensional space (38);

the intersection of said optical axis (41) and said axis of symmetry (44) defining the origin of said second Cartesian reference frame (X',Y',Z') of said viewing sensor;

said second cartesian reference frame comprising perpendicular coordinate X',Y',Z' axes, one axis (Z') of which is oriented along said optical axis;

said television camera (31) picking up a two-dimensional image defining an image plane, at the center (CI) of which is definable a point corresponding to the origin of said second reference system arranged with first and second coordinate axes (X', Y') perpendicular to each other and in the image plane.

11. A method as claimed in claim 10, characterized in that said step of calculating said rotation matrix comprises the substeps of:

performing (98) a cycle of initial calculating operations wherein the positions of reference elements of a gauge (60) in relation to the first reference system (X,Y,Z) are measured;

said gauge (60) presenting a number of faces, each of which presents a central reference element (63);

positioning (100) said viewing sensor facing a face of the gauge (60) by orienting said viewing sensor according to a selected axis (Z) of the first Cartesian reference frame;

said television camera (31) picking up a reference element (63) in the image plane;

automatically repositioning (110) said measuring head (15) in a first position (pi) so that the center of the image of the reference element is located exactly at the image center (CI) and the Z' axis of the second cartesian reference frame passes exactly through the center of the reference element;

shifting (120) said measuring head (15) along the selected axis (Z) of the measuring machine (10); said shift causing the image of the reference element to move away from the center of the image plane;

automatically repositioning (130) said measuring head (15) in a second position (p2) so that the center of the image of the reference element is located exactly at the image center (CI); in which position, the Z' axis of the second reference system passes exactly through the center of the reference element;

calculating (140) a first line through the first and second positions (p1, p2) and relative to the first reference system; said first line corresponding to the Z' axis;

automatically repositioning (150) the measuring head (15) in such a manner that, in the image picked up by the television camera (31), the reference element is located close to the first coordinate axis Y';

automatically positioning (160) said measuring head (15) in a third position (p3) so that the center of the image of the reference element is located exactly on the first coordinate axis Y'; in which position, the first coordinate axis Y' passes exactly through the center of the reference element;

shifting (170) said measuring head (15) so that the image of the reference element moves away from the first coordinate axis Y';

automatically repositioning (180) the measuring head (15) in a fourth position (p4) so that the center of the image of the reference element is located exactly on the first coordinate axis Y'; in which position, the Y' axis passes exactly through the center of the reference element;

calculating (190) a second line relative to the first reference system (X,Y,Z) and through said third and fourth positions (p3, p4); said second line corresponding to the first coordinate axis Y';

calculating (200), given the Z' and Y' axes of the second reference system, the X' axis perpendicular to the Z' and Y' axes to fully define the second reference system (X',Y',Z');

calculating (210) said rotation matrix (ROT-MAT) expressing the rotation relationship between the X,Y,Z axes of the first reference system and the X',Y',Z' axes of the second reference system.

12. A method as claimed in claim 11, characterized in that said gauge (60) presents cross sections defined by regular octagons, and is defined by twenty-six flat lateral walls;

the gauge comprising eighteen square walls and eight triangular walls;

each square and triangular wall presenting, in the center, a circular dead hole (63) acting as a reference element.

13. A method as claimed in claim 11, characterized in that said step of calculating said OFFSET vector comprises the substeps of:

automatically positioning (250) the measuring head (15) along the Z' axis of the second reference system (X', Y',Z') to a fifth position (p5) wherein a laser line (50), formed by the intersection of said beam (35) and a face of said gauge, is located exactly in the center of the image plane, and the center of the reference element is located exactly at the image center (CI);

the value of said fifth position (p5) having been determined in said initial cycle (98);

calculating (260) the OFFSET vector on the basis of the distance, relative to said first reference system, between the fifth position (p5) and the position of said reference point (CT) of said movable element (12) for which said fifth position is determined.

14. A method as claimed in claim 10, characterized by comprising the step of calculating a number of intrinsic parameters describing the internal performance of the viewing sensor (25) and for correlating the dimensions of an object picked up in said two-dimensional image to the real dimensions of the object.

15. A method as claimed in claim 14, characterized in that said step of calculating a number of intrinsic parameters comprises the substeps of:

repositioning (265) said measuring head along the Z' axis of said second reference system to reach a first initial position K1(X1,Y1,Z1) wherein the image of the reference element is located exactly at the center of the image plane;

shifting (270) said measuring head (15) along the Z' axis to reach a first final position K2(X2,Y2,Z2);

analyzing (275) said two-dimensional image to determine a first pixel shift (y-pix), along the Y' axis through the image plane, of the laser line formed by the intersection of said laser beam and a face of said gauge (60);

calculating (280) parameters on the basis of the first pixel shift (y-pix) and said first initial and final position;

repositioning (285) said measuring head (15) along the Z' axis to reach a second final position K3(X3,Y3,Z3);

analyzing (290) said image to determine a second pixel shift (y1-pix) of the laser line along the Y' axis through the image plane;

calculating (295) at least one intrinsic parameter on the basis of at least said first and second pixel shifts (y-pix, y1-pix).

16. A method as claimed in claim 14, characterized in that said step of calculating said intrinsic parameters comprises the substeps of:

positioning (300) the measuring head (15) along the Z' axis of the second reference system to reach a first preliminary position P3(X3,Y3,Z3) in which the image of the reference element is located exactly in the center of the image plane;

repositioning (310) said measuring head (15) by moving it along three axes to reach a first end position P1(X1, Y1,Z1);

analyzing (320) said two-dimensional image to determine first pairs of pixel shifts (x-pix, y-pix) of the image of said reference element along two coordinate axes (X'and Y') through the image plane and relative to displacement between the first preliminary position and the first end position;

calculating (340) first numbers of parameters on the basis of said first pair of pixel shifts (x-pix, y-pix) and said first preliminary and end position;

repositioning (350) said measuring head (15) along the Z' axis, so that the image of a reference element is located in the center of the image plane in a second preliminary position;

repositioning (360) the measuring head (15) along three axes to reach a second end position P2(X2,Y2,Z2);

analyzing (362) said image to determine second pairs of pixel shifts (x'-pix, y'-pix) of the image of said reference element along two coordinate axes (X' and Y') through the image plane and relative to displacement between the second preliminary position and the second end position;

calculating (365) second numbers of parameters on the basis of said second pairs of pixel shifts (x'-pix, y'-pix) and said second preliminary and end position;

defining (366) said intrinsic parameters as a function of said first and second numbers of parameters.

* * * * *